No. 782,852. PATENTED FEB. 21, 1905.
A. IMM.
POTATO PARING MACHINE.
APPLICATION FILED OCT. 21, 1904.

WITNESSES.
Lewis E. Flanders
Thomas D. Longstaff

INVENTOR.
August Imm
Attorneys.

No. 782,852.

Patented February 21, 1905.

UNITED STATES PATENT OFFICE.

AUGUST IMM, OF DETROIT, MICHIGAN.

POTATO-PARING MACHINE.

SPECIFICATION forming part of Letters Patent No. 782,852, dated February 21, 1905.

Application filed October 21, 1904. Serial No. 229,372.

*To all whom it may concern:*

Be it known that I, AUGUST IMM, a citizen of the United States of America, residing at Detroit, in the county of Wayne and State of Michigan, have invented certain new and useful Improvements in Potato-Paring Machines, of which the following is a specification, reference being had therein to the accompanying drawings.

This invention relates to improvements in potato-paring machines of the class in which the peel is removed by a scouring action between abrading-surfaces, and its object is to provide means for keeping the abrading-surfaces free of the skins and particles removed from the tubers and to so arrange and construct the machine that the tubers are positively carried into contact with the abrading-surface and constantly stirred to bring every potato into contact with said surface.

It is also an object of the invention to provide the same with the advantages of the particular construction, arrangement, and combination of parts, all as hereinafter more fully described, reference being had to the accompanying drawings, in which—

Figure 1:
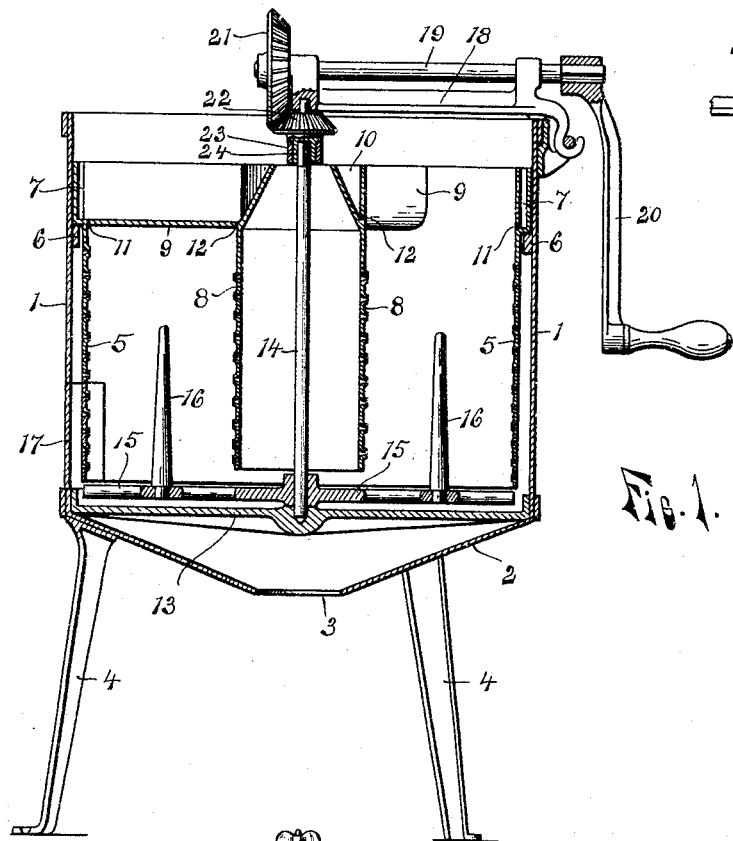
Figure 3:
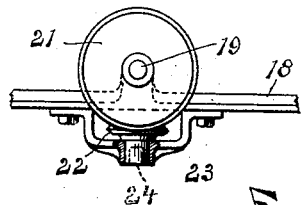
Figure 2:
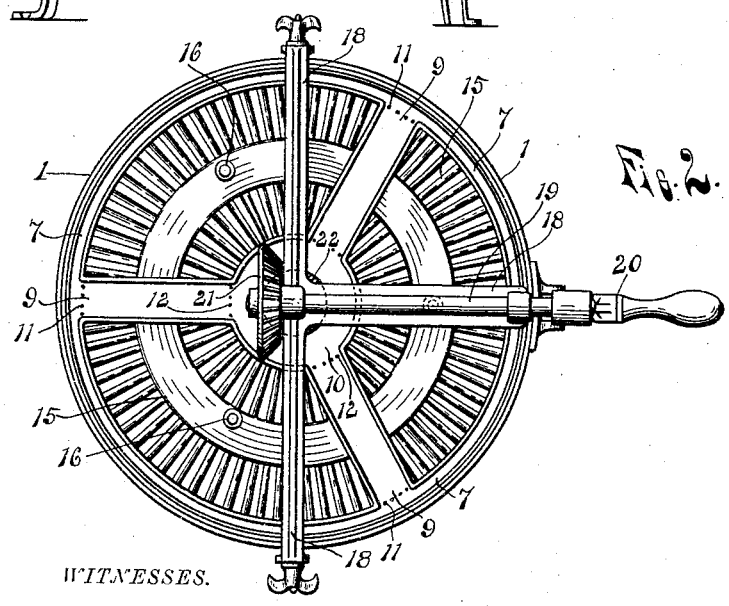

Figure 1 is a central vertical section of a device embodying the invention. Fig. 2 is a plan view of the same, and Fig. 3 is a detail of the means for supporting the driving mechanism.

1 is an outer cylindrical casing open at the top and provided with a conical-shaped bottom 2, having an axial discharge-opening 3 and supported upon suitable legs 4. A removable perforated wall 5, forming an abrading-surface, is supported within the casing with a space between said wall and casing by securing a ring 6 to the inner surface of the casing in a position to engage an outwardly-extending narrow ring-shaped trough or channel 7, formed integral with the upper end of said wall and of a size to fit within the casing, said wall forming the inner wall of the channel. In the axis of the casing is a perforated cylinder 8, forming an inner abrading-surface, and hollow radial arms 9 are formed integral with the upper end of said cylinder and channel 7 to support the cylinder and form connecting-channels between the outer ring channel or trough 7 and the inner V-shaped ring channel or trough 10, formed on the upper end of the cylinder by securing an inwardly-inclined wall to the inner surface of the vertical cylinder-wall near its upper end. A row of perforations 11 is provided in the inner wall of the trough 7, and also a row 12 in the cylinder-wall which forms the side of the V-trough, so that the water contained in said troughs will trickle down over the abrading-surfaces and wash them free of peelings and particles from the potatoes.

A supporting-bar 13, extending across the bottom 2 within the casing, is provided with a socket in the axis of the casing to receive the end of a vertically-extending shaft 14, to which is secured a grated disk 15 below the lower ends of the abrading-walls. Secured to said disk and extending upward therefrom midway between the abrading-walls is a number of fingers or pins 16, and in the side of the casing and abrading-wall above the disk is a door 17, through which the potatoes may be removed after having been operated upon sufficiently.

Detachably secured to the top of the casing is a supporting-frame 18, provided with bearings for a radially-extending shaft 19, to the outer end of which is secured a crank 20, the opposite end being provided with a bevel-gear 21 to mesh with a similar gear 22, supported upon a bracket 23, secured to the under side of the frame 18 and provided with a socket to receive the hub of said gear, which is thus held in mesh with the other gears and carried by the detachable supporting-frame. The hub of gear 22 is provided with a squared socket 24 to receive the squared upper end of the vertical axial shaft 14, and thus when the supporting-frame is secured in place the gears are connected to said vertical shaft to transmit motion thereto from the radial shaft, which is turned by the operator by means of the crank.

The potatoes to be peeled having been placed in the space between the abrading-walls 5 and 8 and water poured into the troughs, the operator turns the crank 20 and motion is transmitted by the gears to the shaft 14, carrying the grated disk 15. The potatoes are supported by this disk, with the pins 16 projecting up among the potatoes, and therefore when said disk is revolved the potatoes are carried around and constantly stirred and turned by the pins, so that each potato is brought into rubbing or scouring contact with the stationary walls 5 and 8 and constantly turned, thus very quickly and effectually removing the skins. The water from the troughs 7 and 10 trickles down over the abrading-surface during the process of scouring, and thus the skins and particles removed from the potatoes, which would otherwise clog said surfaces and prevent their effective operation, are constantly washed clean thereby. The skins, &c., are also carried by the water into the conical bottom 2 and out through the discharge-opening 3, the grated bottom allowing the free escape of the same, but retaining and supporting the potatoes, which roll around on the same but are not injured thereby, as there are no sharp edges or projections on the disk. The troughs or channels being arranged as described, the water flows directly over the surfaces where it is most needed, and the channels are connected so that the water may flow from one to another. When the skins have been effectually removed, the potatoes, which have been washed clean by the water, are taken out through the door 17. The frame 18 is then detached, thus permitting the walls 5 and 8, together with their integral troughs, to be readily lifted out, cleaned, and dried. The disk 15 may then also be readily removed, together with its shaft, leaving the interior of the casing clear, so that it may be kept clean and dry when not in use.

Having thus fully described my invention, what I claim is—

1. In a potato-parer, the combination with a casing, of an outer cylindrical abrading-wall supported within the casing, an axial abrading-cylinder, a revoluble grated disk supported by the casing below the said abrading-walls, means for revolving said disk, and pins on the disk extending upward within the space between the abrading-walls.

2. In a potato-parer, the combination with a supporting-casing having a discharge-opening in its bottom, of a stationary cylindrical abrading-wall adjacent to the wall of the casing and supported thereby, an axial stationary abrading-cylinder, means for supporting the said cylinder, a vertical shaft in the axis of the cylinder having a bearing at its lower end in the casing, a grated disk secured to said shaft near its lower end, pins on the disk extending upward in the space between the abrading-surfaces of the stationary wall and cylinder, and means engaging the upper end of the shaft to turn the same.

3. In a potato-parer, the combination with a supporting-casing having a discharge-opening in its bottom, of a stationary cylindrical abrading-wall supported adjacent to the casing, an abrading-cylinder stationarily supported coaxially with the casing, troughs at the upper ends of the abrading wall and cylinder and having openings to discharge the water contained therein upon the abrading-surfaces, a grated disk beneath the lower ends of the wall and cylinder to support and move the tubers and permitting the free passage into the bottom of the casing of the particles removed from the tubers and washed from the abrading-surfaces by the water, upward projections upon the disk extending into the space between the wall and cylinder, and means for revolving the disk.

4. In a potato-parer, the combination with a supporting-casing, of a vertical abrading-wall within the casing at a distance from the wall of the casing, a trough formed on the upper end of said wall of a size to fit within the casing, said wall forming the inner wall of said trough and provided with openings for the escape of the water therein, an abrading-cylinder supported coaxially with the axis of the casing, a trough formed on the upper end of said cylinder having openings for the discharge of the contents of said trough upon the abrading-surface of the cylinder, hollow radial arms formed integral with said troughs to support the cylinder and form passages connecting the troughs, a disk supported below the lower ends of the wall and cylinder, and means for turning said disk.

5. In a potato-parer, the combination with a supporting-casing having a conical bottom provided with an axial discharge-opening, of a cylindrical vertically-extending abrading-wall supported at a distance from the wall of the casing, a supporting-ring secured to the inner face of the casing-wall, a trough formed integral with the upper end of the abrading-wall and of a size to fit within the casing, and resting upon the ring to support the abrading-wall, an abrading-cylinder, a V-shaped trough formed on the upper end of the cylinder and provided with a series of openings in its side wall, hollow radial arms formed integral with said troughs to connect the same and support the cylinder, a supporting-bar in the bottom of the casing having a socket, a shaft supported within the axis of the casing with its lower end in the socket, a grated disk secured to said shaft below the lower end of said cylinder, pins on said disk extending upward in the space between the abrading wall and cylinder, a detachable supporting-frame attached to the top of the casing, a radial shaft supported in bearings on said frame, a crank on one end of said shaft, a pinion on the opposite end of said shaft, and a pinion supported and carried by the frame in engagement with the pinion on the shaft and provided with a socket to receive the upper end of the vertical shaft to which the disk is secured.

In testimony whereof I affix my signature in presence of two witnesses.

AUGUST IMM.

Witnesses:
OTTO F. BARTHEL,
LEWIS E. FLANDERS.